Patented Aug. 9, 1949

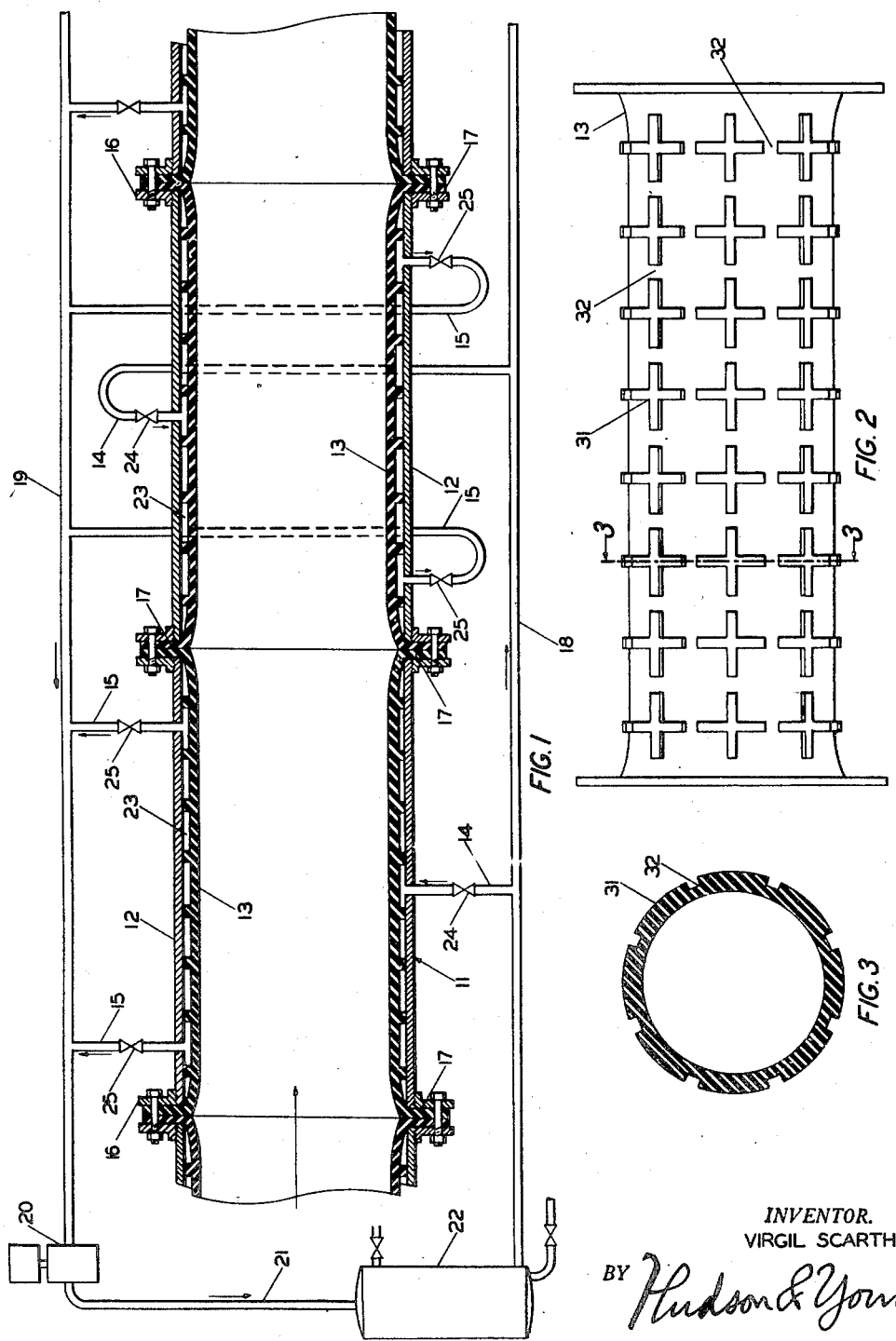

2,478,326

UNITED STATES PATENT OFFICE 2,478,326

PIPE-LINE TRANSPORTATION OF FINE SOLIDS

Virgil Scarth, Bartlesville, Okla., assignor to Phillips Petroleum Company, a corporation of Delaware Application December 17, 1945, Serial No. 635,591

14 Claims. (Cl. 302—66)

This invention relates to the transportation of finely comminuted solids. In one of its more specific aspects it relates to the transportation of finely divided solid materials in pipelines.

The transportation of finely divided solids has for many materials presented difficult problems. The distance to be transported, the degree of subdivision, the nature of the solid material and many other factors require consideration. Powdery material like cement is ordinarily packaged in cloth or paper bags for shipping and sometimes for storage. For movement from one grinder or pulverizer to another or to a storage bin, cement is frequently conveyed in screw conveyors. Such conveying and packaging appears to be rather successful and few unsolved problems are apparent.

One property of powdered cement which contributes to its ease of bulk transportation is its free flowing or nonsticky nature. In contrast, the transportation of such a material as carbon black exhibits many problems, as yet unsolved. Certain types of carbon black can be formed into small spherical balls or "pelleted" as termed by the industry. In this condition, the carbon black flows in pipes, can be elevated by bucket elevators, or transferred horizontally or even up an incline by a screw conveyor, or moved by belt conveyors. Pelleted black can even be transported by rail in specially constructed "tank" cars.

Some carbon blacks do not readily pellet and hence must be moved or transported in bulk form. Other carbon blacks may permit formation of pellets which are not sufficiently firm for tank car shipments without excessive breakage. Such pellets, may however, be sufficiently dense to meet density requirements. Carbon black as manufactured is very light and fluffy or flocculent. It usually weighs only 2 to 4 pounds per cubic foot. In this condition shipment costs are high on account of the large bulk. Further, the handling of flocculent carbon black is a dusty and disagreeable operation. In addition this flocculent black is very sticky and adhesive and tends to accumulate or adhere in thick layers on container walls. Flocculent black does not readily flow. Carbon black which does not readily pellet is usually compressed and packaged in paper bags for long distance shipment.

An object of my invention is to provide an apparatus and a method of operation of this apparatus for the transportation of carbon black.

Another object of my invention is to provide a method and apparatus for the pipeline transportation of carbon black.

Yet another object of my invention is to provide a method and apparatus for the pipeline transportation of any finely divided solid material.

Still other objects and advantages will be apparent to those skilled in such art from a careful study of the following description and the attached drawing which respectively describe and illustrate a preferred embodiment of my invention and form a part of this specification.

Figure 1 of the drawing shows a diagrammatic plan view of a preferred embodiment of my pipe-line transportation system.

Figure 2 shows a diagrammatic plan view of a section of flexible rubber tubing for assembly within a steel casing.

Figure 3 is a cross sectional view of the rubber tubing taken on the line 3—3 of Figure 2.

Referring to the drawing and specifically to Figure 1, a section of a transportation pipeline 11 is composed of some steel tubing or piping 12, some inner rubber tubing 13, some inlet gas connections 14 and some outlet gas connections 15. Each section of steel tubing 12 has a flange 16 on either end for bolting to the adjacent flange. Likewise, each length of rubber tubing has a flange 17 integral with the tubing and on either end thereof.

The inlet gas or air connections 14 are manifolded into a high pressure main 18, while the gas or air outlet connections are manifolded into a return line 19. The return line 19, which may carry return air, connects to the intake side of an air compressor 20. The high pressure outlet from the compressor connects with a high pressure line 21 leading to a surge tank 22.

The rubber tubing sections, one of which is illustrated diagrammatically in Figures 2 and 3, are of substantially the same length as the individual pipe sections 12. The rubber tubes are substantially cylindrical in cross section and have some lugs or protruding ridges 31 on their exterior surface. It is not critical that these ridges form any special design or pattern. I do however, make provision for the flow of a gas through an annular space between the rubber tubing member 13 and the steel tubing 12. These ridges or lugs are intended to assist in causing turbulent flow of a gas entering the annular space from inlet pipe 14 and leaving in pipes 15. As shown in Figure 2 these ridges are arranged in two series at right angles to one another. Further each ridge is not continuous but passes some open spaces 32 so that in case a section of a rubber tube touches the surface of the enclosing steel pipe the flow of this gas from inlet 14 to outlets 15 will not be cut off and that gas can flow at all times. Both the longitudinal ridges and the circular ones have these open spaces.

Figure 3 shows a cross section of a rubber tube member taken on the line 3—3 of Figure 2. This cross section shows an approximate distribution of the ridge openings around the circumference of the tube.

In the operation of this apparatus for the transportation of such solid material as carbon black the fine solids are injected along with a carrying gas into the inlet end of such a pipeline as herein disclosed. The injection apparatus may be of any design and construction desired, the only requirement being that it satisfactorily provide a substantially constant feed of solid material and a gas under pressure. One method that has proven satisfactory is to compress the gas separately and pull the fine solid material into the gas stream by an injector type of apparatus, the effluent mixture of gas and solid material being discharged directly into the inlet end of the pipeline. Another method that has been used is a centrifugal pump that pumps a mixture of gas and the fine solid.

The solid material and gas, once in the pipeline under pressure, flow through the pipeline toward the discharge end. Sufficient gas under sufficient pressure is used to keep the solid material in rapid motion, thereby eliminating any tendencies for the solid material to settle out.

At the discharge end of the pipeline, the solid material may be collected in filter bags, or settling rooms, or by any other suitable means.

In operations wherein air is used as the transporting or carrying gas, then preferably air should be the gas injected in the annular space 23 of each pipe unit. In areas in which natural gas is cheap or plentiful, such a gas may be used as the transporting medium. One advantage in this respect may reside in the availability of a high pressure gas from a gas well, and under such conditions further compression may not be necessary, provided of course the length of the pipeline is not too great.

When a combustible gas, such as natural gas, is used as the carrying medium, then preferably natural gas should be the gas injected into the plurality of annular spaces 23 throughout the length of the pipeline to minimize any explosive hazards. Likewise, when air is the transporting gas, then air should be the annular space gas.

The injection of the gas, as for example air, into the annular space 23 between the rubber tubing 13 and the steel casing 12 produces a flexing or vibration of the rubber tube that prevents the carbon black from sticking to the inside of the rubber tube. This action is necessary since carbon black, even though a completely dry powder, free from tar or other sticky or adhesive matter, is itself very sticky, and sticks to container surfaces. This tendency is so great that handling of carbon black is frequently a difficult problem. I have found that the vibration or flexing caused by the air flowing into, around and out of the annular spaces 23 completely and efficiently prevents deposition of carbon black on the rubber tube walls.

For best operation relative to the point of prevention of carbon black deposition, the pressure of the incoming air, and the pressure of the outgoing air need to be adjusted for each individual installation since many factors need be considered. Each rubber tube, or rubber tubes of different manufacture, or of different lengths, or different kinds of rubber, possess different flexing properties. The type and arrangement of the lugs on the rubber tubing also affect this flexing.

In the drawing, I have shown one air inlet tube and two air outlet tubes for each pipe section. In some installations, it has been found that one inlet and one outlet tube are sufficient, but in other cases more are necessary. A preferred number and arrangement of the tubes is shown in the drawing with one inlet approximately centered with respect to the length of each pipe section, and one outlet at either end. The inlet tube 14 of one section may be positioned 180° around the pipe from the inlet tube 14 of an adjacent section, and similarly for the two outlet tubes 15 of the sections. By staggering the inlet tubes 14 from section to section I am able to obtain a more efficient overall operation.

I have found one important point in operating such a system in that the air pressure in the annular space 23 should be some higher than the air pressure within the rubber tube 13. By maintaining a pressure differential in this direction I have been able to increase markedly the degree of flexing or vibration of the rubber tube and accordingly the efficiency of carbon black transportation. The pressure, however, should not collapse the rubber tube sections since such would decrease the apparent cross sectional area of the rubber tube conveyors.

By construction of the tube system in the manner herein described, there is substantially no tendency for the rubber tube sections to move or to stretch in a downstream direction due to the friction of the stream of carbon black and air.

In some operations, it is advisable to inject the air through the inlet tubes 14 into the annular spaces 23 intermittently. Such operations tend to intensify the vibration or flexing effect, especially at each instant of rapid pressure increase. Another point which lends toward intensifying the flexing effect is the specific installation of each section of rubber tubing. For example, each section of rubber tubing may be installed under tension, or under slight compression or with neither. It is difficult to state the best installation conditions for the rubber tubing since these depend upon numerous other factors, such as load of solid material as carbon black to be transported, rate of travel of the gas and carbon black through the line, and annular space pressure and pressure drop from inlet 14 to outlets 15. Many other factors, such as construction of rubber tube, surface lugs, rigidity of the tube, number of ply of fabric used in the tube construction, etc., are pertinent. For each installation, it is for the most part necessary to experiment or alter the variable conditions when using a given type of rubber tube until transportation seems to be best. For starting such an operation I have found it advisable to use a rubber covered tube of at least 2-ply fabric and install the same under a slight tension.

When operating the air inlet 14 intermittently, as mentioned hereinbefore, best operation is obtained by the use of time clock operated valves. Such clocks can be set for opening and closing the valves 24 to operate at say 5 minute intervals or 10 minute intervals or such other time interval as found to give best operation as regards prevention of carbon black adhesion on the interior tube walls. Time clock controlled valves 25 may also be used in the air outlet tubes 15 and synchronized with those in the inlet tubes 14 to give best flexing or vibrational effects in the rubber tubes.

In extreme cases in which exceptionally sticky carbon black is being transported, I have found it advisable to use a sufficiently high pressure in the annular space 23 to collapse, at least partially, each respective rubber tube section. In this collapsing operation, the rubber tube walls bend and the bending breaks loose any adhering carbon black, since layers or cakes of black are rigid and do not bend or flex with the tube walls. The pressure of the air forced into the annular space may vary from about 1 to 150 pounds or more, under some conditions, than the air pressure within the rubber tube. In most cases these limits can be reduced to from about 10 to 50 pounds per square inch pressure above the inside tube pressure.

The gas or air pressure within the rubber tubing sections may vary considerably from one installation to another, depending for the most part upon the distance a material is to be transported. The greater this pressure, the greater will be the carrying power of the air. Pressures from slightly above atmospheric to as high as 1000 or 1200 pounds per square inch may be used depending upon the pressure drop from one end of the line to the other and depending on such an outlet end pressure as is required to possess a sufficient solid material carrying power at the point of least carrying power, which point is, obviously, at the discharge end of the line. For example, if 100 pounds pressure and a certain air volume and velocity are the minimum requirements for carrying a given quantity of carbon black, that will be the minimum conditions at the discharge end of the line. And if a pressure drop of 300 pounds occurs in the length of the line, it is obvious then that the inlet end pressure will need to be maintained at not less than 400 pounds per square inch pressure. In a case such as this, the annular air pressure might need be about 425 pounds per square inch to maintain the rubber tube walls free of adhering black.

The length of such a pipeline for transportation of a solid material according to my invention is not limited. In one case, such a line may be relatively short, as for example 300 to 400 feet, or such a line may be many miles in length. In case of extremely long lines, intermediate pump or booster stations may be necessary. Any type of pumping equipment may be used which is found desirable and suitable for the problem at hand.

The flexible tubes, which I have described herein as being rubber tubes, need not necessarily be rubber tubes but may be constructed of such material as will permit proper flexing and vibration as herein mentioned. The material should be such that it will easily become freed of adhering carbon black by such flexing action and will successfully withstand partial collapsing and the various pressure differentials herein mentioned.

The flexible tube material and construction should be able to withstand some expansion as will be occasioned by a high internal pressure within the said tube.

The fluid material passing through the annular spaces in the pipeline sections may be not only a gas as hereinbefore disclosed but may be a liquid, such as water. When water is used, the pressure of the water may be varied to affect the flexing and the partial collapsing of the flexible inner tube members to prevent adherence to the tube of the finely divided material in transit. It will be obvious that substantially any liquid can be used providing it is not corrosive or not a solvent for any materials or equipment with which it comes in contact.

The gaseous or liquid material passing through this annular space 23 may be made to follow a tortuous path by provision of ridges and open spaces on the outer surface of the flexible tubing members as hereinbefore mentioned. Similarly, when liquid is passed through this annular space or even gases passed therethrough under certain conditions may cause the flexible tubing to vibrate because of the rapid in-flow of said fluid or by rapid pressure changes, for example, of the "water hammer" type. Such flexing may be of sufficient intensity to prevent material in transit from sticking to the inner walls of the tubing.

In such cases, the flexible tubing may not need the ridges or lugs to give a tortuous fluid flow through the annular space. When gases are used in these annular spaces, the ridges and open spaces providing turbulence to the gas flow are distinctly advantageous.

A flexible tubing section need not necessarily be the same length as each steel casing section, but may be twice or three times as long. The particular length may be dictated in consideration of the manufacturer. However, when both the casing and tubing members are the same length they make convenient assembly units and I prefer to use flexible tubes the same length as the pipe sections.

As mentioned hereinbefore, in case air is used as the pressure gas in the annular space between the flexible tubing and the outer steel walls it need not necessarily be returned to the compressor 20 but may be valve controlled and released to the atmosphere.

If a natural gas is used as a suspending and transporting medium it will be transported from the inlet end of the pipeline to the outlet end along with the carbon black or other finely divided solid material being transported. After separation of the solid material from the transporting gas the gas may be used for fuel for plant or other purposes.

The flanged ends of the flexible tubes serve as gaskets between the steel pipe flanges as well as serving to hold the flexible tubes in place as regards downstream expansion tendencies.

For those skilled in the art it will be obvious that many alterations and variations in the transportation system as herein described may be made without change in the principles and scope of my invention.

Having disclosed my invention, I claim:

1. A method for transporting a finely divided solid material, comprising the steps of injecting the finely divided solid material and a first gas under pressure up to approximately 1200 pounds per square inch into the inner tubing of a pipeline having a rigid outer casing with gas inlets and outlets in its walls, said flexible inner tubing being spaced from said rigid casing; intermittently supplying a second gas through said wall inlets at a pressure between approximately 1 and 150 pounds per square inch more than the pressure on the first gas; and removing said second gas through said wall outlets, whereby caking is substantially prevented by the flexing of the tubing caused by the intermittent feeding of the second gas and by the turbulent motion of said gas.

2. The method of claim 1 wherein the finely divided solid material is a carbon black and the injection gas and said second gas are air.

3. The method of claim 1 wherein the finely divided solid material is a carbon black and the injection gas and said second gas are natural gas.

4. A method for transporting a finely divided solid material, comprising the steps of injecting the finely divided solid material and a first gas under pressure into the inner tubing of a pipeline having a rigid outer casing with a plurality of gas inlets and outlets in its walls and a flexible inner tubing spaced from said casing by separated lugs on the outer surface of said tubing; intermittently supplying a second gas through the gas inlets in the casing wall at a pressure up to 150 pounds per square inch greater than the pressure on the first gas; and removing said second gas through said gas outlets, whereby caking is substantially prevented by flexing of the tubing caused by intermittent feeding of the second gas.

5. The method of claim 4 wherein the injection gas and the second gas are air and the solid material being transported is carbon black.

6. The method of claim 4 wherein the injection gas and the second gas are natural gas and the solid material being transported is carbon black.

7. A method for transporting a finely divided solid material, comprising the steps of injecting a finely divided solid material and a first gas stream under pressure into the inner tubing of a pipeline having a rigid outer casing with a plurality of orifices in its walls and a flexible inner tubing spaced from said casing by separated lugs; supplying a second gas through certain of said wall orifices at a pressure greater than the pressure on the first gas; and extracting said second gas through other said wall orifices, whereby caking is substantially prevented by the vibration and flexing of the tubing caused by the turbulent sweep of the gas stream through the spaces formed by the separated lugs.

8. The method of claim 7 wherein the finely divided solid material is a carbon black and the first gas and second gas are air.

9. The method of claim 7 wherein the finely divided solid material is a carbon black and the first gas and second gas are natural gas.

10. A pipeline assembly for transporting a finely divided material, comprising in combination a plurality of outer casing sections, each said casing section having an outwardly turned flange at each end and at least one gas inlet and at least one gas outlet in its wall; a plurality of sections of flexible inner tubing having protruding interrupted ridges extending around their exterior surface and an outwardly turned flange on each end of each said tubing section, individual said tubing sections being inserted within said casing sections so that said ridges rest against the inner surface of said casing sections and said flanges of said tubing fit against the outer end surface of the adjacent flange on an outer casing and said casing sections being assembled so that said flanges of said tubing sections serve as gaskets between said flanges of said casing sections, thus forming a continuous conduit of flexible inner tubing and separate gas chambers partially interrupted by said separated ridges; and means to supply gas under pressure to said gas chambers through the inlets in said casing wall and withdraw said gas through said outlets.

11. The apparatus of claim 10 wherein single sections of flexible inner tubing are longer than a single section of outer casing.

12. The apparatus of claim 11 wherein the inlets and outlets in the outer casing wall are oppositely disposed.

13. The apparatus of claim 10 wherein the inlets and outlets in the outer casing wall are oppositely disposed.

14. A pipeline assembly for the transportation of finely comminuted solid materials, comprising in combination a rigid outer casing; an inner flexible tubing spaced from said casing by interrupted lugs extending about the outer surface of said tubing; means to seal said tubing at its ends to said casing; and means to inject gas into and withdraw gas from the space between said inner tubing and said outer casing.

VIRGIL SCARTH.

REFERENCES CITED

The following references are of record in the file of this patent:

UNITED STATES PATENTS

| Number | Name | Date |
| --- | --- | --- |
| 907,692 | Hervey | Dec. 1908 |

FOREIGN PATENTS

| Number | Country | Date |
| --- | --- | --- |
| 294,522 | Germany | Oct. 12, 1916 |
| 578,373 | Germany | Oct. 29, 1931 |